US009628721B2

(12) United States Patent
Moon et al.

(10) Patent No.: US 9,628,721 B2
(45) Date of Patent: Apr. 18, 2017

(54) IMAGING APPARATUS FOR GENERATING HIGH DYNAMIC RANGE IMAGE AND METHOD FOR CONTROLLING THE SAME

(71) Applicant: SAMSUNG ELECTRONICS CO., LTD., Suwon-si (KR)

(72) Inventors: Kyoung-hwan Moon, Suwon-si (KR); Young-geol Kim, Seoul (KR); Jae-young Roh, Uiwang-si (KR); Na-youn Park, Suwon-si (KR); Je-seung Yeon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/743,006

(22) Filed: Jun. 18, 2015

(65) Prior Publication Data

US 2016/0156828 A1 Jun. 2, 2016

(30) Foreign Application Priority Data

Nov. 27, 2014 (KR) .......................... 10-2014-0167533

(51) Int. Cl.
*H04N 5/235* (2006.01)
*H04N 5/232* (2006.01)

(52) U.S. Cl.
CPC ......... *H04N 5/2355* (2013.01); *H04N 5/2353* (2013.01); *H04N 5/23245* (2013.01)

(58) Field of Classification Search
CPC .. H04N 5/23232; H04N 5/2355; H04N 5/355; H04N 5/35536; H04N 5/35545; H04N 5/3535; H04N 5/35572; H04N 5/35554; H04N 5/35581

USPC .......................................................... 348/221.1
See application file for complete search history.

(56) References Cited

U.S. PATENT DOCUMENTS

| 2003/0117518 | A1* | 6/2003 | Pyle | H04N 5/2351 348/364 |
|---|---|---|---|---|
| 2007/0077055 | A1* | 4/2007 | Tominaga | H04N 5/23248 396/256 |
| 2014/0313369 | A1* | 10/2014 | Kageyama | G06T 11/001 348/223.1 |
| 2014/0333801 | A1* | 11/2014 | Moon | H04N 1/2145 348/231.99 |
| 2014/0347521 | A1* | 11/2014 | Hasinoff | H04N 5/2355 348/239 |

* cited by examiner

*Primary Examiner* — Nelson D. Hernández Hernández
(74) *Attorney, Agent, or Firm* — Sughrue Mion, PLLC

(57) ABSTRACT

An imaging apparatus is provided, which includes an image capturer configured to generate a plurality of short-exposure images by performing continuous imaging for a first time in a first imaging mode in which imaging is performed through exposure over the first time, a processor configured to control the image capturer to generate at least one short-exposure image by performing additional imaging after the first time if an imaging command is input in a state where the first imaging mode and an HDR (High Dynamic Range) mode are set, and an image processor configured to synthesize the short-exposure images generated by the image capturer by successively accumulating the short-exposure images.

15 Claims, 8 Drawing Sheets

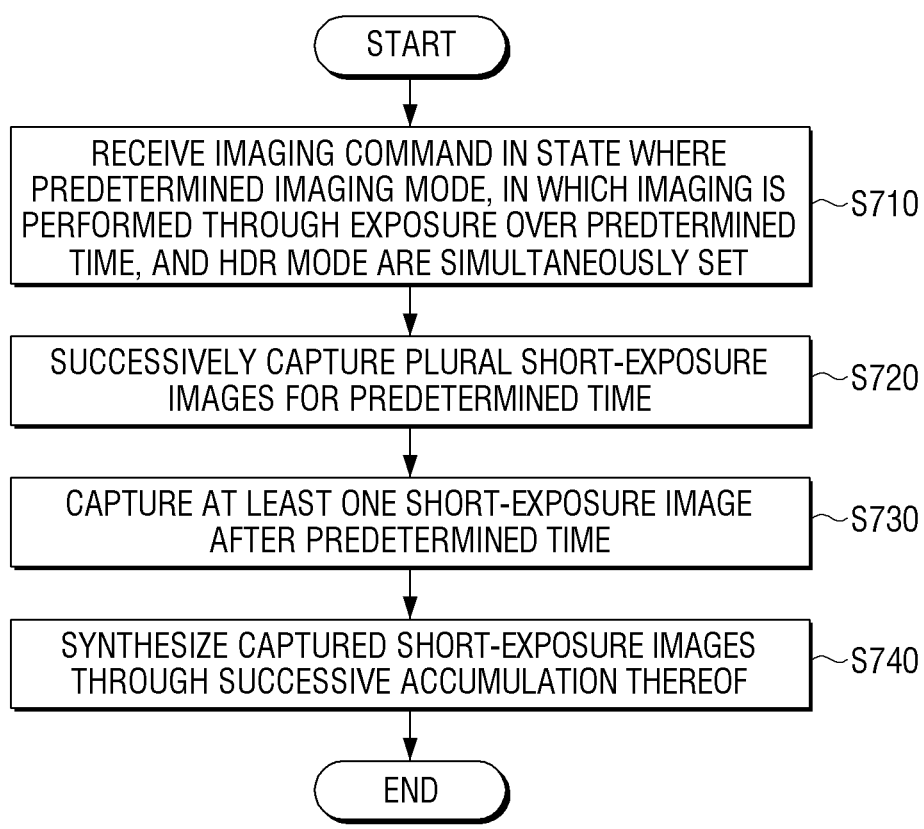

IMAGING APPARATUS FOR GENERATING HIGH DYNAMIC RANGE IMAGE AND METHOD FOR CONTROLLING THE SAME

CROSS-REFERENCE TO RELATED APPLICATION(S)

This application claims priority under 35 U.S.C. §119(a) from Korean Patent Application No. 10-2014-0167533, filed on Nov. 27, 2014, in the Korean Intellectual Property Office, the disclosure of which is incorporated herein by reference in its entirety.

BACKGROUND

1. Field

Exemplary embodiments relate to an imaging apparatus and a method for controlling the same, and more particularly to an imaging apparatus that generates a High Dynamic Range (HDR) image and a method for controlling the same.

2. Description of the Related Art

With the development of electronic technologies, imaging apparatuses having various functions have been developed. For example, in capturing images to generate a long-exposure image, a function of displaying such a long-exposure image that shows changes in real time in accordance with an exposure time has recently been developed for imaging apparatuses.

However, at present, the performance of an imaging apparatus is not as exquisite as that of the human eye. In particular, the human eye has a grayscale range that is wider than that of the imaging apparatus. Grayscales indicate concentration levels that are gradually changed from a bright portion to a dark portion of a picture or a photograph. As the grayscale range becomes wider, recognition of the bright portion and the dark portion may become clearer. That is, in an image that is captured by an imaging apparatus having a relatively narrow grayscale range, the bright portion or the dark portion may be expressed differently from that of an actual view of that image by a human eye.

Accordingly, an HDR mode imaging function has been developed. In an HDR mode, an image having an appropriate exposure is generated through synthesis of a plurality of images having different exposure times.

However, in the HDR mode, imaging is generally performed to generate three sheets of an image in accordance with respective exposure times, and thus the imaging in the HDR mode may take about three times longer than the imaging in a general mode. Particularly, in the case of performing imaging to generate a long-exposure image in the HDR mode, the imaging time may be further prolonged thereby increasing the chance of the imaging apparatus trembling or shaking, and thus the quality of the captured image may be deteriorated.

Accordingly, there may be a need for technology that can improve the image quality even in the case where a user performs imaging to generate a long-exposure image in the HDR mode.

SUMMARY

Exemplary embodiments address at least the above problems and/or disadvantages and provide at least the advantages described below. Accordingly, aspects of the exemplary embodiments provide an imaging apparatus and a method for controlling the same, which can promptly generate an HDR image using a plurality of short-exposure images that are generated through continuous imaging and additional imaging.

According to an aspect of an exemplary embodiment, there is provided an imaging apparatus including an image capturer configured to generate a plurality of short-exposure images through performing continuous imaging for a predetermined time in a predetermined imaging mode in which imaging is performed through exposure over the predetermined time; an image processor configured to synthesize the short-exposure images that are generated by the image capturer through successively accumulating the short-exposure images; and a processor configured to control the image capturer to generate at least one short-exposure image through performing additional imaging after the predetermined time if an imaging command is input in a state where the predetermined imaging mode and an HDR (High Dynamic Range) mode are simultaneously set.

The processor may control the image processor to generate an HDR image through synthesizing a first image in which a predetermined number of short-exposure images among the plurality of short-exposure images that are generated for the predetermined time are successively accumulated, a second image in which the plurality of short-exposure images that are generated for the predetermined time are successively accumulated, and a third image in which the second image and at least one short-exposure image that is generated after the predetermined time are accumulated.

The processor may operate to generate the HDR image through determining a bright portion and a dark portion of the second image through analysis of the second image, replacing the bright portion of the second image by a corresponding first image region, and replacing the dark portion of the second image by a corresponding third image region.

The processor may change and apply the predetermined exposure time on the basis of a histogram of the image synthesized through the successive accumulation.

The imaging apparatus according to the aspect of the exemplary embodiment may further include a storage, wherein the processor stores the images that are synthesized through the successive accumulation thereof in the storage, and operates to generate an HDR image on the basis of the stored synthesized image.

The imaging apparatus according to the aspect of the exemplary embodiment may further include a user interface, wherein the processor sets the predetermined time as a time when an HDR imaging end command is input through the user interface.

According to an aspect of another exemplary embodiment, there is provided a method for controlling an imaging apparatus including receiving an input of an imaging command in a state where a predetermined imaging mode in which imaging is performed through exposure over a predetermined time and an HDR (High Dynamic Range) mode are simultaneously set; successively generating a plurality of short-exposure images for the predetermined time, and generating at least one short-exposure image after the predetermined time; and synthesizing the generated short-exposure images through successively accumulating the short-exposure images.

The synthesizing may generate an HDR image through synthesizing a first image in which a predetermined number of short-exposure images among the plurality of short-exposure images that are generated for the predetermined time are successively accumulated, a second image in which the plurality of short-exposure images that are generated for the predetermined time are successively accumulated, and a third image in which the second image and at least one short-exposure image that is generated after the predetermined time are accumulated.

The synthesizing may generate the HDR image through determining a bright portion and a dark portion of the second image through analysis of the second image, replacing the bright portion of the second image by the first image region, and replacing the dark portion of the second image by the third image region.

The method according to the aspect of this exemplary embodiment may further include changing and applying the predetermined exposure time on the basis of a histogram of the image synthesized through the successive accumulation.

The synthesizing may store the images that are synthesized through the successive accumulation thereof in the storage, and generate an HDR image on the basis of the stored synthesized image.

The method according to the aspect of this exemplary embodiment may further include if an HDR imaging end command is input, setting the predetermined time as a time when the HDR imaging end command is input.

As described above, according to the various embodiments, since the imaging apparatus can generate the HDR image more promptly and thus can obtain the imaging results with less shaking, user satisfaction can be improved.

BRIEF DESCRIPTION OF THE DRAWINGS

The above and/or other aspects, features and advantages of the exemplary embodiments will be more apparent from the following detailed description when taken in conjunction with the accompanying drawings, in which:

FIG. 7 is a flowchart explaining a method for controlling an imaging apparatus according to an exemplary embodiment.

DETAILED DESCRIPTION OF EXEMPLARY EMBODIMENTS

Hereinafter, exemplary embodiments are described in detail with reference to the accompanying drawings.

Figure 1:
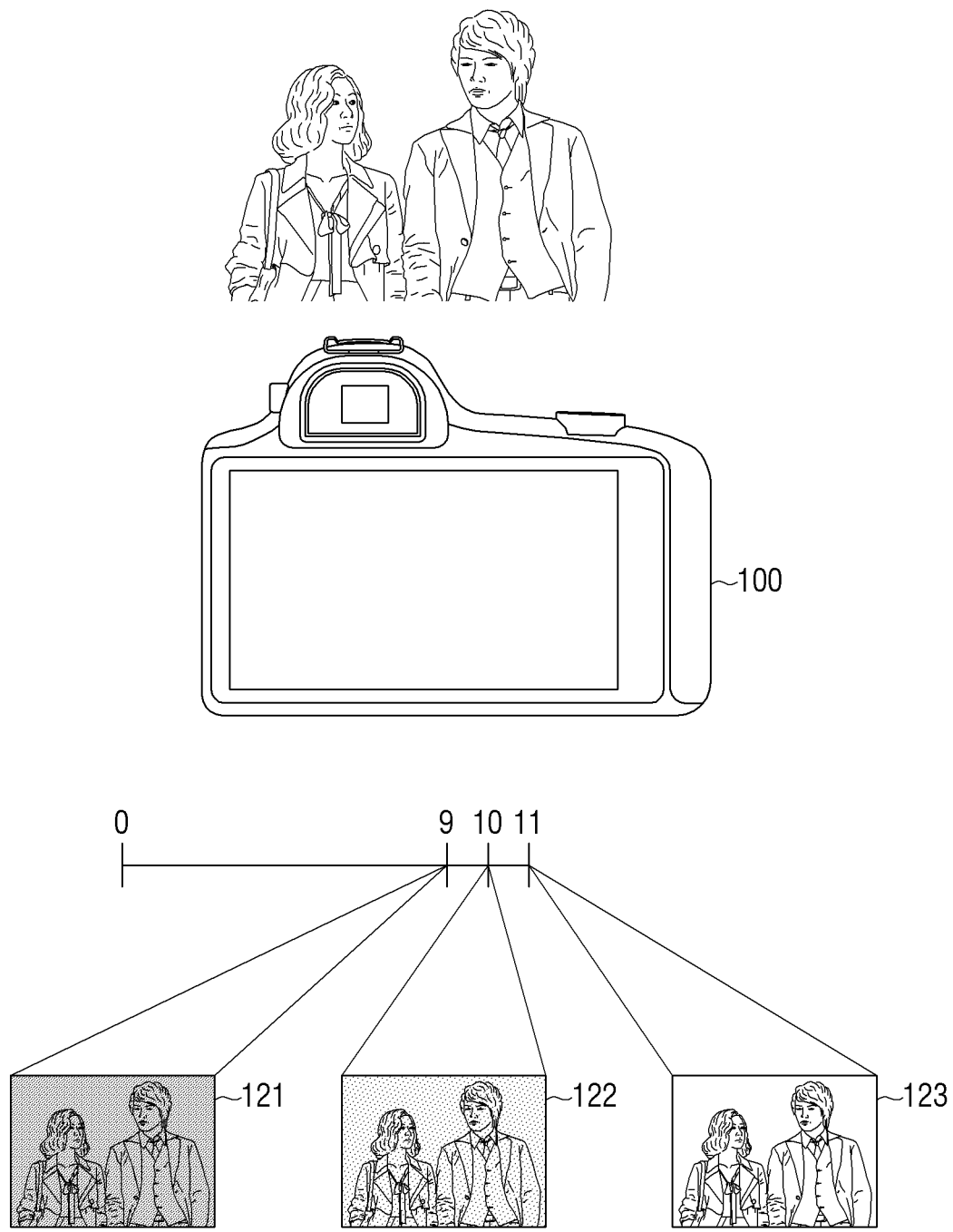
FIG. 1 is a diagram schematically explaining the operation of an imaging apparatus 100 according to an exemplary embodiment.

FIG. 1 is a diagram schematically explaining the operation of an imaging apparatus 100 according to an exemplary embodiment.

As illustrated in FIG. 1, an imaging apparatus 100 may be implemented by a digital camera device, but is not limited thereto. The imaging apparatus 100 may be implemented by various devices that can perform imaging, such as a smart phone provided with a camera and a TV provided with a camera.

The imaging apparatus 100 may generate at least one of a short-exposure image and a long-exposure image through performing imaging in accordance with a predetermined event. Here, the short-exposure image may mean an image having a short exposure time, and the long-exposure image mean an image having a long exposure time. However, the length of the exposure time for discriminating between the short-exposure image and the long-exposure image may be relative.

The imaging apparatus 100 may generate a plurality of short-exposure image through performing continuous imaging for a predetermined time. Here, the predetermined time may be set by default in the imaging device 100, or may be an exposure time that is set by a user.

On the other hand, the long-exposure image may be an image that is obtained by capturing only one sheet of an image, but is not limited thereto. For example, the imaging apparatus 100 may generate the long-exposure image through successively generating the short-exposure images and synthesizing the generated short-exposure images by accumulating them.

Hereinafter, it is assumed that the long-exposure image is generated by generating a plurality of short-exposure images and synthesizing the generated short-exposure images through accumulation. That is, if an imaging command for a short-exposure image is input, only one short-exposure image may be generated, whereas if an imaging command for a long-exposure image is input, a plurality of short-exposure images may be generated, and then one long-exposure image may be generated through synthesizing the generated plurality of short-exposure images.

For example, if the predetermined exposure time is 10 seconds, the imaging apparatus 100 may generate 10 short-exposure images through performing continuous imaging of short-exposure images each having an exposure time of 1 second for the exposure time of 10 seconds, but the technique is not limited thereto. For example, the short-exposure images may also be generated by performing continuous imaging for an exposure time that is shorter than the predetermined exposure time (e.g., 9 seconds) or for an exposure time that is longer than the predetermined exposure time (e.g., 11 seconds). Further, the exposure time of the short-exposure image is not limited to 1 second, but may be set by a user.

The imaging apparatus 100 may synthesize the generated short-exposure images through successively accumulating the short-exposure images. In particular, the imaging apparatus 100 may synthesize the generated short-exposure images through successively accumulating the short-exposure images for the predetermined exposure time. For example, in the above-described example, if a first short-exposure image is generated, the imaging apparatus 100 may simply store the first short-exposure image without performing any further operation. Thereafter, if a second short-exposure image is generated, the imaging apparatus 100 may synthesize the first and second short-exposure images. Then, if a third short-exposure image is generated, the imaging apparatus 100 may synthesize the previously synthesized image and the third short-exposure image, but the technique is not limited thereto. For example, the generated short-exposure images may not be successively synthesized, but may be synthesized at the same time.

If an imaging command is input in a state where a predetermined imaging mode and an HDR mode are simultaneously set, the imaging apparatus 100 may generate at least one short-exposure image after the predetermined exposure time.

The predetermined imaging mode may be a mode for generating a long-exposure image over the predetermined exposure time. In accordance with the hardware or software performance of the imaging apparatus 100, the imaging apparatus 100 may generate a long-exposure image over the predetermined exposure time. The details thereof will be described later.

On the other hand, in a state where the HDR mode is set, the imaging apparatus 100 may generate at least one short-exposure image after the predetermined exposure time. For example, referring to FIG. 1, it is assumed that the exposure time is 1 second, and the predetermined exposure time is 10 seconds. Accordingly, the imaging apparatus 100 may generate a synthesized image 123 through accumulation of the generated images for 11 seconds.

Further, the imaging apparatus 100 may store an image 121 that is synthesized through accumulation for 9 seconds and an image 122 that is synthesized through accumulation for 10 seconds. The imaging apparatus 100 may generate a long-exposure HDR image (hereinafter also referred to as an "HDR image") using the synthesized images 121, 122, and 123. This will be described later.

As described above, the imaging apparatus 100 may synthesize the short-exposure images through the accumulation thereof, and generate the HDR image more promptly through generating at least one short-exposure image after the predetermined exposure time.

Hereinafter, the imaging apparatus 100 will be described in more detail.

Figure 2A:
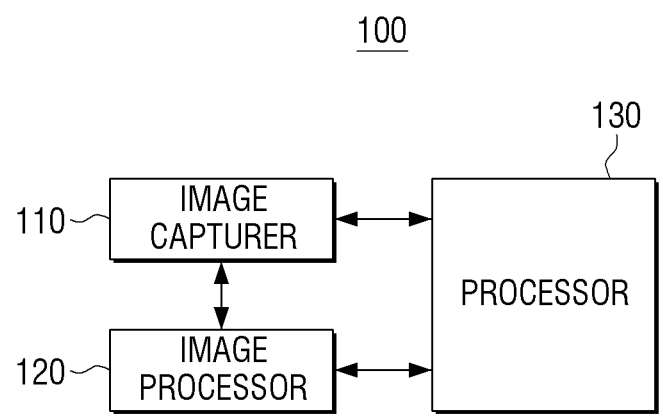
FIGS. 2A and 2B are block diagrams illustrating the configuration of an imaging apparatus according to various exemplary embodiments.

FIG. 2A is a block diagram illustrating the configuration of an imaging apparatus 100 according to an exemplary embodiment. As illustrated in FIG. 2A, the imaging apparatus 100 may include an image capturer 110, an image processor 120, and a processor 130.

The image capturer 110 may generate an image through capturing an image of an object. The image capturer 110 may include a lens, a shutter, an iris, a solid state pickup device, a TG (Timing Generator), and an AFE (Analog Front End). The shutter may adjust time when light that is reflected by the object enters into the imaging device 100, and the iris may adjust the quantity of light that is incident to the lens through mechanically increasing or decreasing the size of an opening through which the light passes. The solid state pickup device may convert the light that is reflected by the object into photo-charge to be accumulated, and output an image by the photo-charge as an electrical signal. The TG may output a timing signal for reading out pixel data of the solid state pickup device, and the AFE may digitalize the electrical signal that is output from the solid state pickup device through sampling the electrical signal.

Further, the image capturer 110 may perform imaging to generate the short-exposure image and the long-exposure image. The short-exposure image and the long-exposure image that are generated by the image capturer 110 may be transmitted to the image processor 120. As described above, the long-exposure image is generated by generating the short-exposure images multiple times and synthesizing the generated short-exposure images. Accordingly, if an imaging command for the long-exposure image is input, a plurality of short-exposure images may be transmitted to the image processor 120.

The exposure time of the short-exposure image may be determined in accordance with the hardware performance of the imaging apparatus 100. However, the exposure time of the short-exposure image may be determined by a shutter speed, and the exposure time of the short-exposure image may be determined in accordance with the limit of the shutter speed. For example, if it is assumed that shutter speed at which the imaging apparatus 100 can perform fastest imaging is $1/1000$ second, it is not possible to input the imaging command for the long-exposure image through setting the predetermined exposure time to $1/1000$ second since it is unable to generate the short-exposure image faster than $1/1000$ second. However, as described above, if the predetermined exposure time is 10 seconds, the exposure time of the short-exposure image may be determined in various ranges.

Further, the exposure time of the short-exposure image may be determined in accordance with the software performance of the imaging apparatus 100. The short-exposure images that are successively generated may be synthesized through accumulation by the image processor 120. In this case, the exposure time may be limited depending on the processing speed of the image processor 120. For example, a specific image processor 120 may require $1/100$ second in synthesizing two sheets of image, and in this case, it is unable to input the imaging command for the long-exposure image through setting the predetermined exposure time to $1/100$ second.

As described above, the hardware performance and the software performance have been exemplified, but are not limited thereto. For example, when the long-exposure image is generated, the exposure time of the short-exposure image may be limited due to heat generation.

The image processor 120 may perform white balance adjustment, gamma correction, color interpolation, color correction and resolution conversion. In particular, the image processor 120 may synthesize the short-exposure images that are generated by the image capturer 110 through successive accumulation of the short-exposure images under the control of the processor 130.

The processor 130 may control the whole operation of the imaging apparatus 100.

In general, the processor 130 is a configuration that serves to control the apparatus, and may also be called a central processing unit, a microprocessor, or a controller to control the whole operation of the apparatus. The processor 130 may be implemented as a single chip system (SOC (System-On-a-Chip) or SoC (System on Chip)) together with another functional constituent element, such as a communicator 150.

When the imaging command is input in a state where the predetermined imaging mode and the HDR mode are simultaneously set, the processor may generate at least one short-exposure image after the predetermined exposure time.

Further, the processor 130 may control the image processor 120 to generate an HDR image through synthesizing a first image in which a predetermined number of short-exposure images among the plurality of short-exposure images that are generated for the predetermined exposure time are successively accumulated, a second image in which the plurality of short-exposure images that are generated for the predetermined exposure time are successively accumulated, and a third image in which the second image and at least one short-exposure image that is generated after the predetermined exposure time are accumulated.

In addition, the processor 130 may generate the HDR image through determining a bright portion and a dark portion of the second image through analysis of the second image, replacing the bright portion of the second image by a corresponding first image region, and replacing the dark portion of the second image by a corresponding third image region.

Further, the processor 130 may change and apply the predetermined exposure time on the basis of a histogram of the image synthesized through the successive accumulation.

Further, the imaging apparatus 100 may further include a storage, and the processor may store the images that are synthesized through the successive accumulation thereof in the storage, and operate to generate the HDR image on the basis of the stored synthesized image(s).

Further, the imaging apparatus 100 may further include a user interface, and the processor 130 may set the predetermined exposure time as a time when an HDR imaging end command is input through the user interface.

Hereinafter, the basic configuration to help understanding of the exemplary embodiments will be described.

Figure 2B:
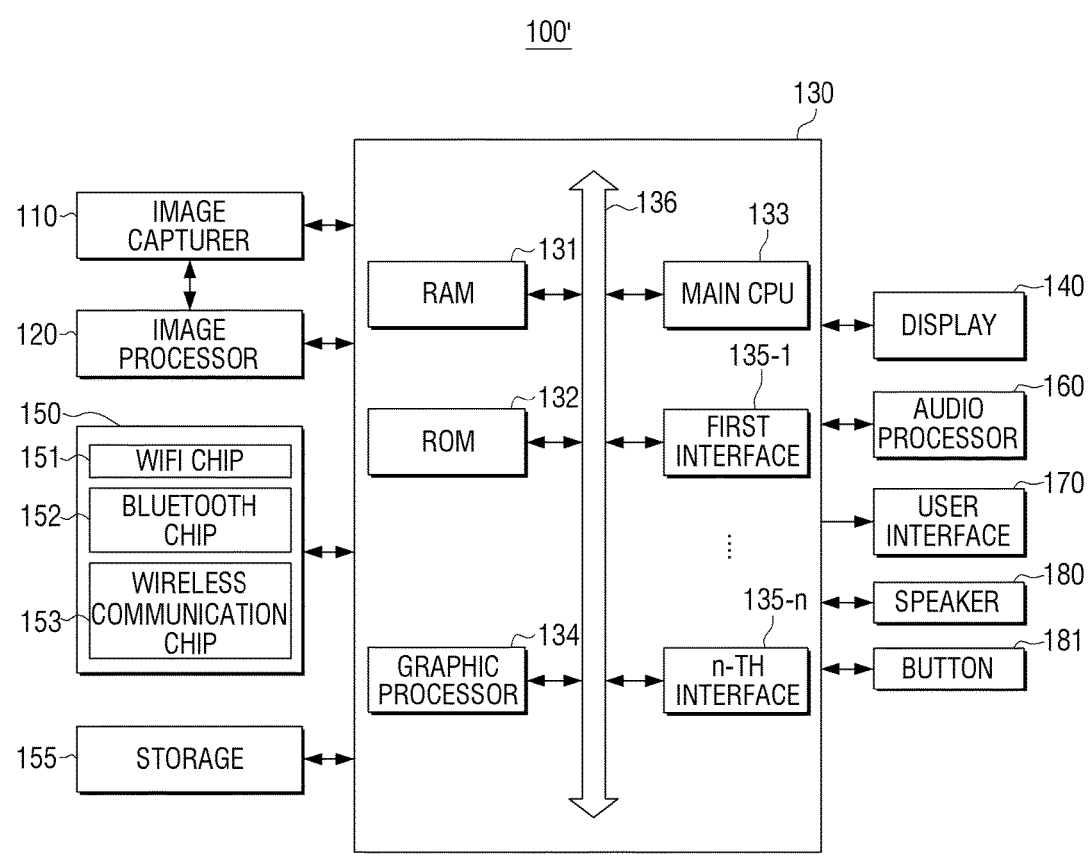

FIG. 2B is a block diagram illustrating the detailed configuration of an imaging apparatus 100' according to another exemplary embodiment. Referring to FIG. 2B, the imaging apparatus 100' may include an image capturer 110, an image processor 120, a processor 130, a display 140, a communicator 150, a storage 155, an audio processor 160, a user interface 170, a speaker 180, and a button 181. In FIG. 2B, the detailed explanation of the constituent elements illustrated in FIG. 2B, which overlap the constituent elements illustrated in FIG. 2A, will be omitted.

The processor 130 may control the whole operation of the imaging apparatus 100 using various kinds of modules stored in the storage 155.

Specifically, the processor 130 may include a RAM 131, a ROM 132, a main CPU 133, a graphic processor 134, first to n-th interfaces 135-1 to 135-n, and a bus 136.

The RAM 131, the ROM 132, the main CPU 133, the graphic processor 134, and the first to n-th interfaces 135-1 to 135-n may be connected to one another through the bus 136.

The first to n-th interfaces 135-1 to 135-n are connected to the various kinds of constituent elements as described above. One of the interfaces may be a network interface that is connected to an external device through a network.

The main CPU 133 may access the storage 155, and perform booting using the OS (Operating System) stored in the storage 155. Further, the main CPU 133 may perform various operations using various kinds of modules stored in the storage 155.

In the ROM 132, a command set for system booting may be stored. If a turn-on command is input and a power is supplied, the main CPU 133 may copy the OS stored in the storage 155 into the RAM 131 according to the command stored in the ROM 132, and boot the system through execution of the OS. If the booting is completed, the main CPU 133 may copy various kinds of modules stored in the storage 155 into the RAM 131, and perform various kinds of operations through execution of the modules copied into the RAM 131.

The graphic processor 134 may generate a screen that includes various objects, such as an icon, an image, and a text, using an operator (not illustrated) and a renderer (not illustrated). The operator (not illustrated) may operate attribute values, such as coordinate values, shapes, sizes, and colors of the respective objects to be displayed according to the layout of the screen on the basis of a received control command. The renderer (not illustrated) may generate a screen of various layouts including the objects on the basis of the attribute values operated by the operator (not illustrated). The screen that is generated by the renderer (not illustrated) may be displayed in a display region of the display 140.

On the other hand, the operation of the controller 130 as described above may be performed by modules stored in the storage 155.

The storage 155 may store therein various kinds of data, such as an OS (Operating System) software module for driving the imaging apparatus 100, an image light and shade analyzing module, an HDR image generating module, a histogram analyzing module, and an image synthesizing module.

In this case, the processor 130 may generate images on the basis of the various modules stored in the storage 155, synthesize the generated images, and display the synthesized image(s).

The communicator 150 may include various communication chips, such as a WiFi chip 151, a Bluetooth chip 152, and a wireless communication chip 153. The WiFi chip 151 and the Bluetooth chip 152 may perform communication in a WiFi method and in a Bluetooth method. The wireless communication chip 153 may mean a chip that performs communication according to various communication standards, such as IEEE, Zigbee, 3G (3rd Generation), 3GPP (3rd Generation Partnership Project), and LTE (Long Term Evolution). The communicator 150 may further include an NFC (Near Field Communication) chip that operates in an NFC method using 13.56 MHz band.

In particular, the communicator 150 may transmit the captured or synthesized image to a social networking service (SNS) server, but is not limited thereto. It is also possible for the communicator 150 to transmit the captured or synthesized image to other electronic devices, such as a smart phone and a desktop computer.

The audio processor 160 is a constituent element that processes audio data. The audio processor 160 may perform various processes, such as audio data decoding, amplification, and noise filtering.

The user interface 170 may receive various user interactions. The user interface 170 may be implemented by a remote control receiver that receives a remote control signal from a remote control device. Further, in the case where the imaging apparatus 100 includes a touch-based display 140, the user interface 170 may be implemented in the form of a touch screen that forms a mutual layer structure with a touchpad. In this case, the user interface 170 may be used as the display 140 as described above.

The speaker 180 is a constituent element that outputs not only various kinds of audio data processed by the audio processor 160 but also various kinds of notification sound or voice messages.

The button 181 may be one of various types of buttons, such as a mechanical button, a touchpad, or a wheel, which is formed on a certain region, such as a front, side, or rear portion of a main body of the imaging apparatus 100.

Figure 3:
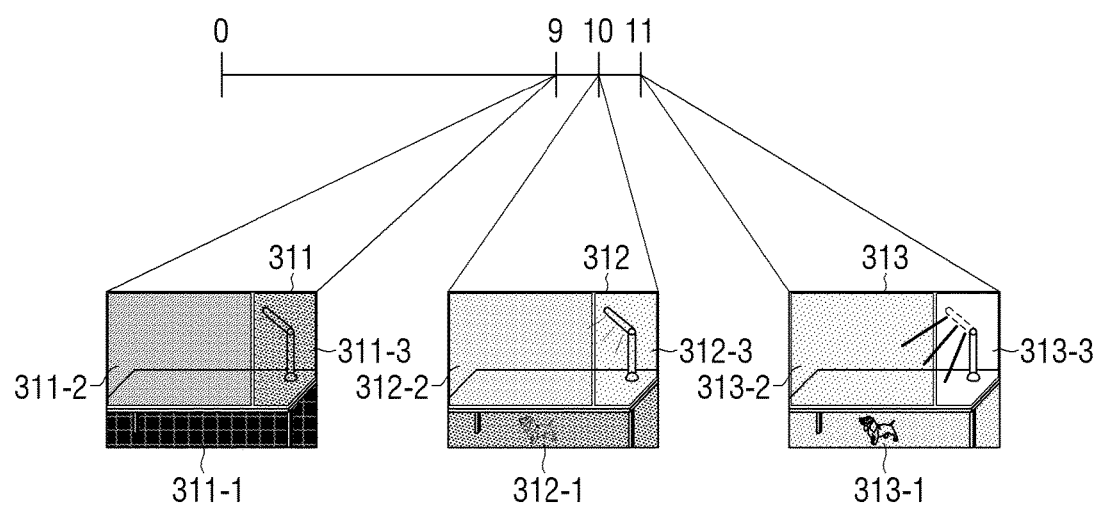
FIG. 3 is a diagram explaining synthesis of short-exposure images per time zone according to an exemplary embodiment.

FIG. 3 is a diagram explaining synthesis of short-exposure images per time zone according to an exemplary embodiment. In FIG. 3, it is assumed that the imaging apparatus 100 generates a predetermined exposure time of 10 seconds and a short-exposure image of 1 second. However, this is merely exemplary as described above.

Referring to FIG. 3, the processor 130 may control the image processor 120 to generate an HDR image through synthesizing a first image 311 in which a predetermined number of short-exposure images among the plurality of short-exposure images that are generated for the predetermined exposure time are successively accumulated, a second image 312 in which the plurality of short-exposure images that are generated for the predetermined exposure time are successively accumulated, and a third image 313 in which the second image and at least one short-exposure image that is generated after the predetermined exposure time are accumulated. For example, the first image 311 may be a synthesized image in which 9 short-exposure images are accumulated for 9 seconds, and the second image 312 may be a synthesized image in which 10 short-exposure images are accumulated for 10 seconds. The third image 313 may be a synthesized image in which 11 short-exposure images are accumulated for 11 seconds.

Further, the imaging apparatus 100 may further include a storage 155, and the processor 130 may store the images that are synthesized through the successive accumulation thereof in the storage 155, and generate the HDR image on the basis of the stored synthesized image.

The third image 313 may be brighter than the first or second image 311 or 312 since more short-exposure images are synthesized in the third image 313. The second image 312 may also be brighter than the first image 311.

On the other hand, since the first to third images 311, 312, and 313 have different brightness for each image region, different results may be shown even if the same image is captured. For example, in the image, since light emitted from a lamp stand does not reach a region under a desk, the corresponding region becomes the darkest region, and the first image 311 among the first to third images 311, 312, and 313 becomes the darkest image. Accordingly, a little dog under the desk may not be shown. Further, since a region just below the lamp stand receives the strongest light, the region becomes the brightest region, and the third image 313 among the first to third images 311, 312, and 313 becomes the brightest image. Accordingly, the region just below the stand may be shown as white, and thus the outline of the stand may not be clearly shown.

In FIG. 3 (and as discussed below, also in FIG. 4), regions 311-1, 312-1, and 313-1 are regions under the desk in first, second, and third images 311, 312, and 313, respectively, regions 311-2, 312-2, and 313-2 are regions on the desk and far apart from the stand in first, second, and third images 311, 312, and 313, respectively, and regions 311-3, 312-3, and 313-3 are regions just below the stand in first and third images 311 and 313, respectively.

Accordingly, the processor 130 may generate the HDR image through combination of appropriate image regions of the first to third images 311, 312, and 313. Generation of the HDR image will be described with reference to FIG. 4.

Figure 4:
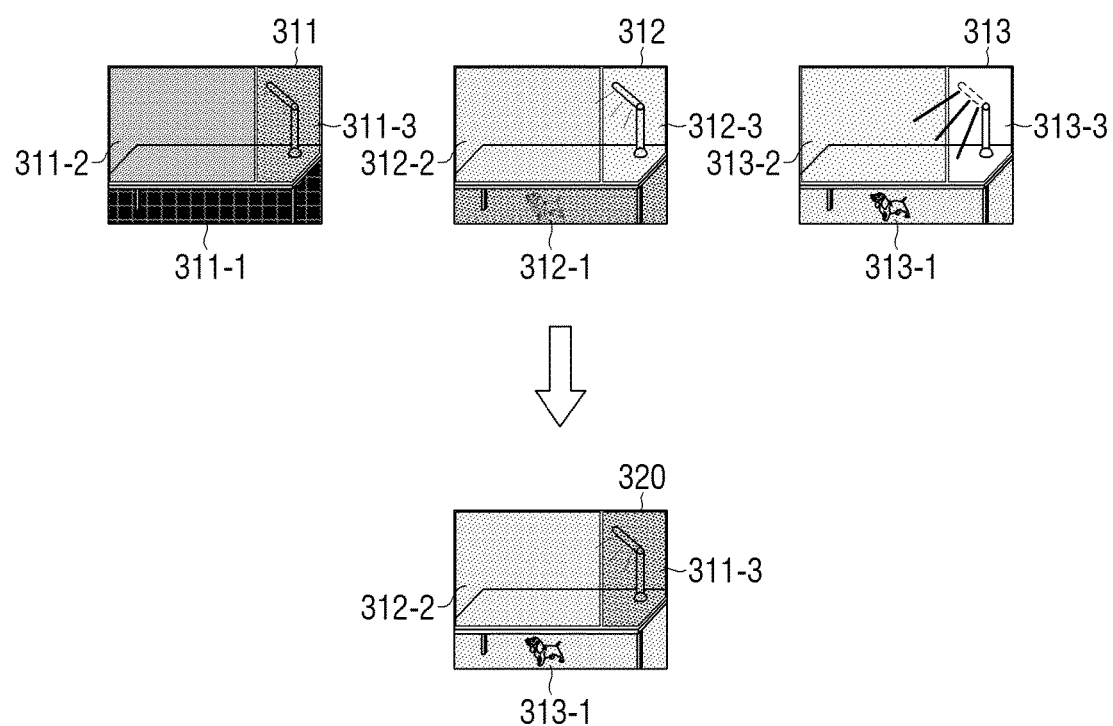
FIG. 4 is a diagram explaining a method for generating an HDR image according to an exemplary embodiment.

FIG. 4 is a diagram explaining a method for generating an HDR image 320 according to an exemplary embodiment.

Referring to FIG. 4, the processor 130 may generate the HDR image 320 through determining a bright portion and a dark portion of the second image 312 through analysis of the second image 312, replacing the bright portion of the second image 312 by a corresponding region of the first image 311, and replacing the dark portion of the second image 312 by a corresponding region of the third image 313. For example, the bright portion of the second image 312 may be a region 312-3 just below the stand, and the dark portion of the second image 312 may be a region 312-1 under the desk. A region 312-2 which is on the desk and is far apart from the stand may be an image having an appropriate exposure. The discrimination among the respective regions of the second image 312 may also be applied to the first and third images 311 and 313 in the same manner, as explained above.

In order to generate the HDR image 320, the processor 130 may replace the bright portion in region 312-3 of the second image 312 by a region 311-3 just below the stand that corresponds to the bright portion of the first image 311, and replace the dark portion in region 312-1 of the second image 312 by a region 313-1 under the desk that corresponds to the dark portion of the third image 313. However, this is merely exemplary, and the HDR image 320 may be generated through giving weights to respective pixels. The weights for the respective pixels may be determined by light and shade of the respective pixels of the second image 312.

Although it is described that the appropriate exposure region, the bright portion, and the dark portion are clearly discriminated, this is merely for convenience in explanation, and as described above, the HDR image 320 may be generated through determining the weights for light and shade of the respective pixels.

Figure 5:
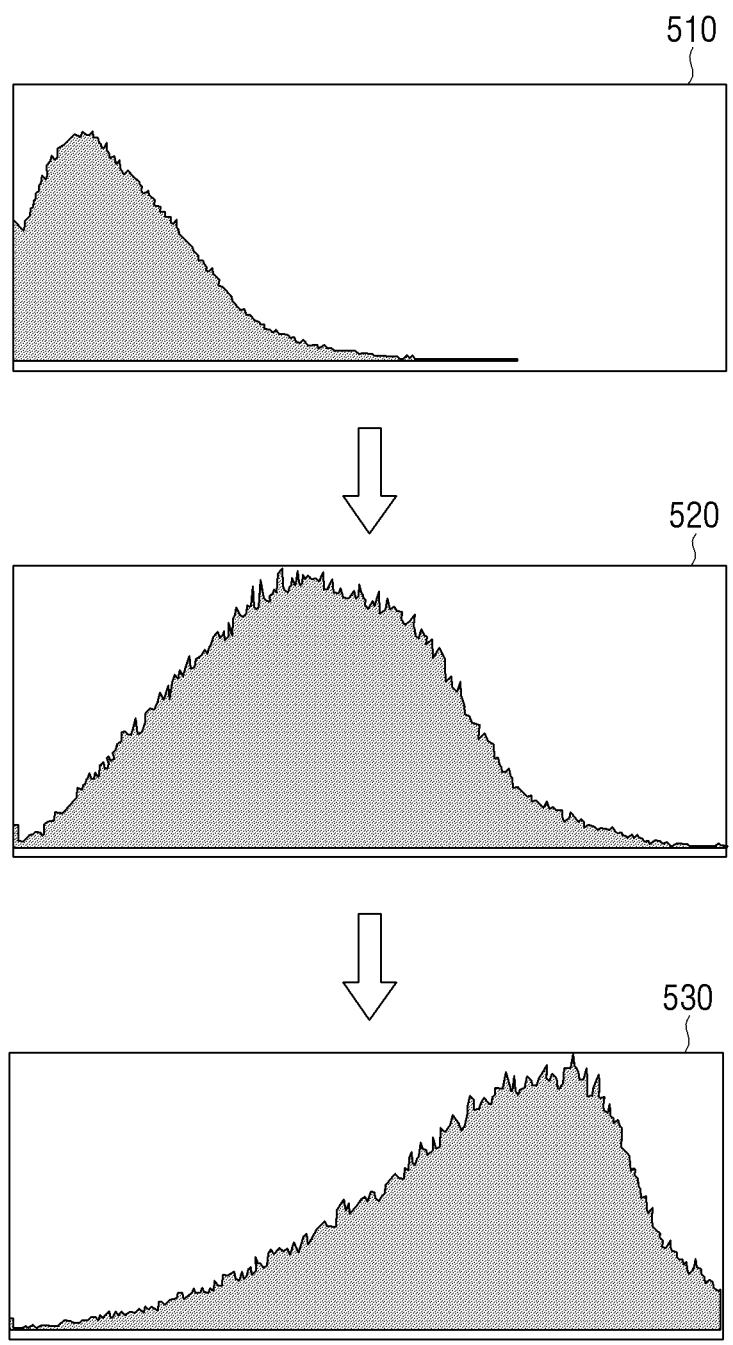
FIG. 5 is a diagram explaining a method for changing a predetermined exposure time according to an exemplary embodiment.

FIG. 5 is a diagram explaining a method for changing a predetermined exposure time according to an exemplary embodiment.

Referring to FIG. 5, the processor 130 may change and apply the predetermined exposure time on the basis of a histogram of the image synthesized through the successive accumulation.

The histogram may be a function that indicates the ratio of the number of pixels having one of concentration levels or the number of all pixels of the image. In particular, FIG. 5 indicates the number of pixels for light and shade. For example, in the first histogram 510, x-axis may indicate light and shade, and y-axis may indicate the number of pixels. The left side of x-axis may indicate dark pixels, and the right side thereof may indicate bright pixels. The second and third histograms 520 and 530 may be functions in the same manner as described above with respect to the first histogram 510.

The processor 130 may display the histogram of the image that is synthesized through successive accumulation. In particular, the processor 130 may display the histogram that is changed as short-exposure images are successively generated. Since the accumulated image becomes bright as the short-exposure images are continuously synthesized, the processor 130 may successively display the first histogram 510, the second histogram 520, and the third histogram 530.

The processor 130 may display the changed histogram, and if the displayed histogram is in the form of the second histogram 520, the processor 130 may end the imaging. That is, during the imaging with exposure over the predetermined exposure time, the processor 130 may perform the exposure until the histogram is in the form of the second histogram 520. An image with an appropriate exposure may be generated in the case where the histogram is in the form of the second histogram 520. However, this is merely exemplary, and the first histogram 510 or the third histogram 530 may be the basis. Further, a case where the brightness values of the largest number of pixels are positioned in the center may be the basis, and a user may end the imaging in accordance with the change of the histogram being displayed.

The processor 130 may change the predetermined exposure time on the basis of the histogram. For example, the processor 130 may set the predetermined exposure time to a time measured from the time when the imaging starts to the time when the histogram reaches the second histogram 520, and generate at least one short-exposure image after the predetermined exposure time.

Figure 6:
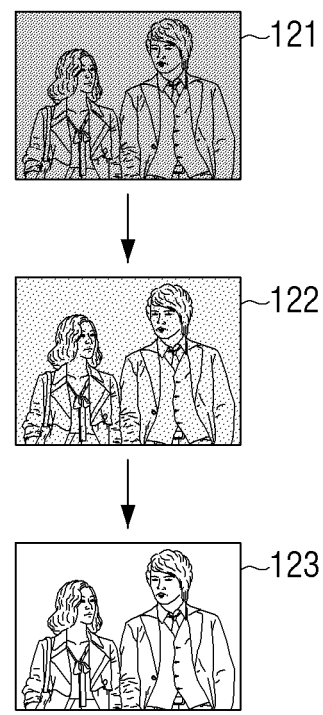
FIG. 6 is a diagram explaining a method for changing a predetermined exposure time according to another exemplary embodiment.

FIG. 6 is a diagram explaining a method for changing a predetermined exposure time according to another exemplary embodiment.

Referring to FIG. 6, the processor 130 may synthesize the short-exposure images 121, 122, and 123 through the successive accumulation thereof, and display in real time the synthesized image. In this case, as the short-exposure images are accumulated to be synthesized, the image may be brightened.

The imaging apparatus 100 may further include a user interface 170, and the processor 130 may set the predetermined exposure time as a time when an HDR imaging end command is input through the user interface 170. For example, at a moment when a user confirms the third image 123, the user may input the HDR imaging end command through the user interface 170. In this case, the processor 130 may set the predetermined exposure time to a time measured from the time when the imaging starts to the time when the HDR imaging end command is input, and generate at least one short-exposure image after the predetermined exposure time.

FIG. 7 is a flowchart explaining a method for controlling an imaging apparatus according to an exemplary embodiment.

The imaging apparatus 100 may receive an imaging command in a state where a predetermined imaging mode in which imaging is performed through exposure over a predetermined time and an HDR mode are simultaneously set (S710). Then, the imaging apparatus 100 may successively generate a plurality of short-exposure images for the predetermined exposure time (S720). After the predetermined exposure time, the imaging apparatus 100 may generate at least one short-exposure image (S730). Then, the imaging apparatus 100 may synthesize the generated short-exposure images through successively accumulating the short-exposure images (S740).

The synthesizing through accumulation (S740) may generate an HDR image through synthesizing a first image in which a predetermined number of short-exposure images among the plurality of short-exposure images that are generated for the predetermined exposure time are successively accumulated, a second image in which the plurality of short-exposure images that are generated for the predetermined exposure time are successively accumulated, and a third image in which the second image and at least one short-exposure image that is generated after the predetermined exposure time are accumulated.

Further, the synthesizing (S740) may generate the HDR image through determining a bright portion and a dark portion of the second image through analysis of the second image, replacing the bright portion of the second image by a first image region, and replacing the dark portion of the second image by a third image region.

The method may further include changing and applying the predetermined exposure time on the basis of a histogram of the image synthesized through the successive accumulation.

The synthesizing (S740) may store the images that are synthesized through the successive accumulation thereof in the storage, and generate an HDR image on the basis of the stored synthesized image.

The method may further include if an HDR imaging end command is input, setting the predetermined exposure time as a time when the HDR imaging end command is input.

As described above, according to the various exemplary embodiments, since the imaging apparatus 100 can generate the HDR image more promptly and thus can obtain the imaging results with less shaking, user satisfaction can be improved.

On the other hand, the methods according to the various exemplary embodiments as described above may be programmed and stored in various kinds of storage media. Accordingly, the above-described methods according to various embodiments can be implemented in various types of electronic devices that execute the storage media.

Specifically, a non-transitory computer readable medium may be provided, in which a program for performing the method, which includes receiving an input of an imaging command in a state where a predetermined imaging mode in which imaging is performed through exposure over a predetermined exposure time and an HDR mode are simultaneously set, successively generating a plurality of short-exposure images for the predetermined exposure time and generating at least one short-exposure image after the predetermined exposure time, and synthesizing the generated short-exposure images through successively accumulating the short-exposure images, is stored.

The non-transitory computer readable medium is not a medium that stores data for a short period, such as a register, a cache, or a memory, but rather a medium which semi-permanently stores data and is readable by a device. Specifically, various applications and programs as described above may be stored and provided in the non-transitory computer readable medium such as a CD, a DVD, a hard disc, a Blu-ray disc, a USB, a memory card and a ROM.

While the disclosure has been shown and described with reference to certain exemplary embodiments thereof, it will be understood by those skilled in the art that various changes in form and detail may be made therein without departing from the spirit and scope of the disclosure, as defined by the appended claims.

What is claimed is:

1. An imaging apparatus comprising:
   an image capturer configured to generate a plurality of short-exposure images by performing continuous imaging for a first time in a first imaging mode in which imaging is performed through exposure over the first time;
   a processor configured to control the image capturer to generate at least one short-exposure image through performing additional imaging after the first time if an imaging command is input in a state where the first imaging mode and an HDR (High Dynamic Range) mode are set; and
   an image processor configured to synthesize the short-exposure images generated by the image capturer by successively accumulating the short-exposure images,
   wherein the processor is further configured to control the image processor to generate an HDR image by synthesizing a first image in which a first number of short-exposure images from among the plurality of short-exposure images that are generated for the first time are successively accumulated, generate a second image in which the plurality of short-exposure images that are generated for the first time are successively accumulated, and generate a third image in which the second image and the at least one short-exposure image that is generated after the first time are accumulated.

2. The imaging apparatus as claimed in claim 1, wherein the processor operates to generate the HDR image by determining a bright portion and a dark portion of the second image through analysis of the second image, replacing the bright portion of the second image by a corresponding first image region of the first image, and replacing the dark portion of the second image by a corresponding third image region of the third image.

3. The imaging apparatus as claimed in claim 1, wherein the processor changes and applies the first time on the basis of a histogram of the synthesized short-exposure images.

4. The imaging apparatus as claimed in claim 1, further comprising a storage,
wherein the processor stores the synthesized short-exposure images in the storage, and operates to generate an HDR image on the basis of the stored synthesized short-exposure images.

5. The imaging apparatus as claimed in claim 1, further comprising a user interface,
wherein the processor sets the first time as a time when an HDR imaging end command is input through the user interface.

6. A method for controlling an imaging apparatus, comprising:
receiving an input of an imaging command in a state where a first imaging mode in which imaging is performed through exposure over a first time and an HDR (High Dynamic Range) mode are set;
successively generating a plurality of short-exposure images for the first time, and generating at least one short-exposure image after the first time; and
synthesizing the generated short-exposure images by successively accumulating the short-exposure images,
wherein the synthesizing comprises generating an HDR image by synthesizing a first image in which a first number of short-exposure images from among the plurality of short-exposure images that are generated for the first time are successively accumulated, a second image in which the plurality of short-exposure images that are generated for the first time are successively accumulated, and a third image in which the second image and the at least one short-exposure image that is generated after the first time are accumulated.

7. The method as claimed in claim 6, wherein the synthesizing comprises generating the HDR image by determining a bright portion and a dark portion of the second image through analysis of the second image, replacing the bright portion of the second image by a first image region of the first image, and replacing the dark portion of the second image by a third image region of the third image.

8. The method as claimed in claim 6, further comprising changing and applying the first exposure time on the basis of a histogram of the synthesized short-exposure images.

9. The method as claimed in claim 6, wherein the synthesizing comprises storing the synthesized short-exposure images in the storage, and generating an HDR image on the basis of the stored synthesized short-exposure images.

10. The method as claimed in claim 6, further comprising if an HDR imaging end command is input, setting the first time as a time when the HDR imaging end command is input.

11. A non-transitory computer readable medium storing a program, which when executed by a processor causes the processor to execute an imaging method, the method comprising:
receiving an input of an imaging command in a state where a first imaging mode in which imaging is performed through exposure over a first time and an HDR (High Dynamic Range) mode are set;
successively generating a plurality of short-exposure images for the first time, and generating at least one short-exposure image after the first time; and
synthesizing the generated short-exposure images by successively accumulating the short-exposure images,
wherein the synthesizing comprises generating an HDR image by synthesizing a first image in which a first number of short-exposure images from among the plurality of short-exposure images that are generated for the first time are successively accumulated, a second image in which the plurality of short-exposure images that are generated for the first time are successively accumulated, and a third image in which the second image and the at least one short-exposure image that is generated after the first time are accumulated.

12. The non-transitory computer readable medium of claim 11, wherein the synthesizing comprises generating the HDR image by determining a bright portion and a dark portion of the second image through analysis of the second image, replacing the bright portion of the second image by a first image region of the first image, and replacing the dark portion of the second image by a third image region of the third image.

13. The non-transitory computer readable medium of claim 11, further comprising changing and applying the first exposure time on the basis of a histogram of the synthesized short-exposure images.

14. The non-transitory computer readable medium of claim 11, wherein the synthesizing comprises storing the synthesized short-exposure images in the storage, and generating an HDR image on the basis of the stored synthesized short-exposure images.

15. The non-transitory computer readable medium of claim 11, further comprising if an HDR imaging end command is input, setting the first time as a time when the HDR imaging end command is input.

* * * * *